June 23, 1959
G. PERSAK, JR
2,892,149
SPARK PLUG TESTER
Filed March 6, 1958
3 Sheets-Sheet 1
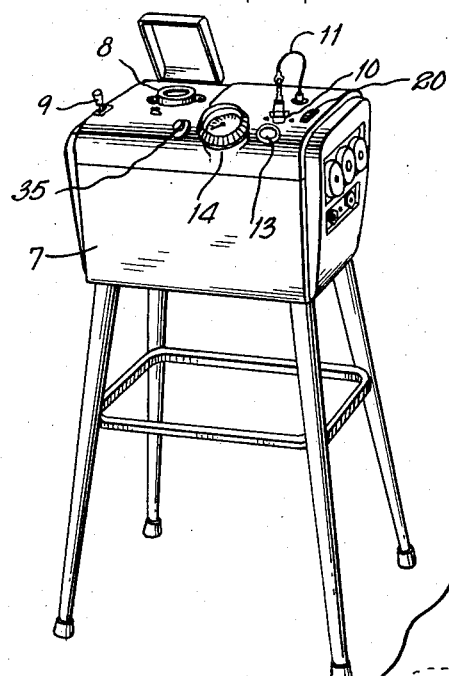
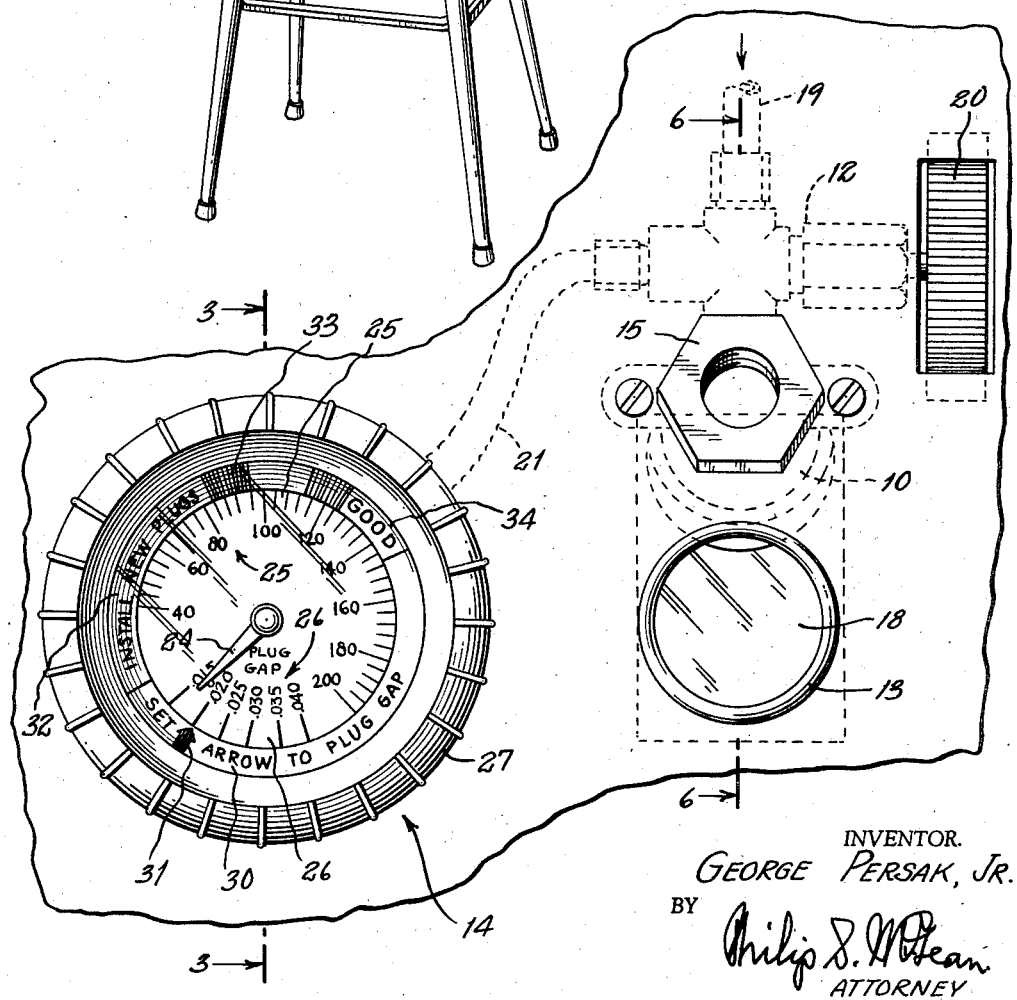
INVENTOR.
GEORGE PERSAK, JR.
BY
ATTORNEY June 23, 1959  G. PERSAK, JR  2,892,149
SPARK PLUG TESTER
Filed March 6, 1958  3 Sheets-Sheet 2
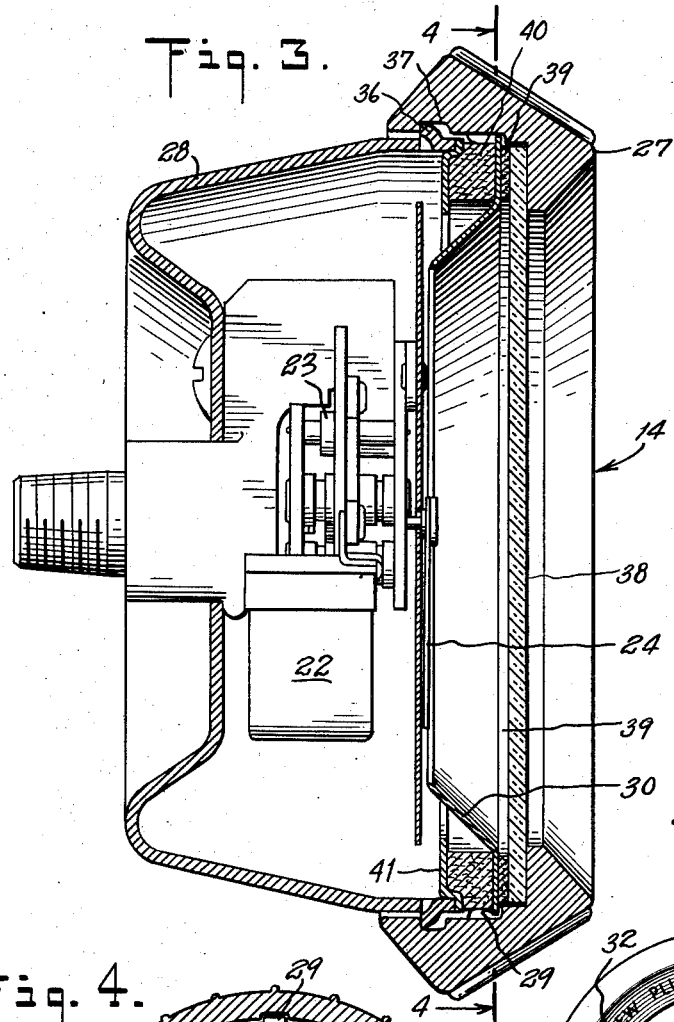
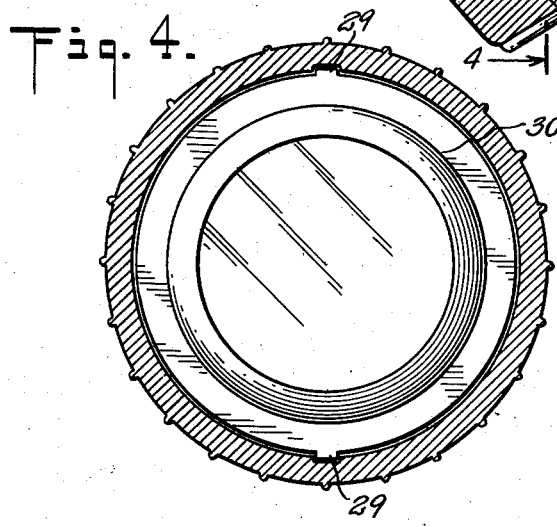
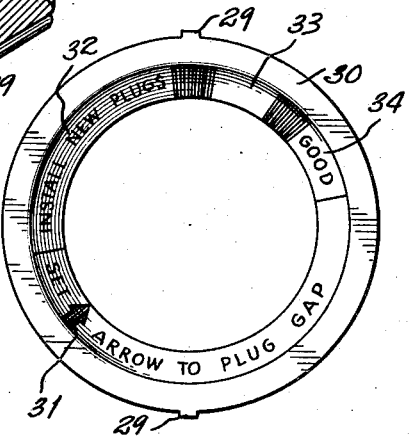
INVENTOR.
GEORGE PERSAK, JR.
BY
ATTORNEY

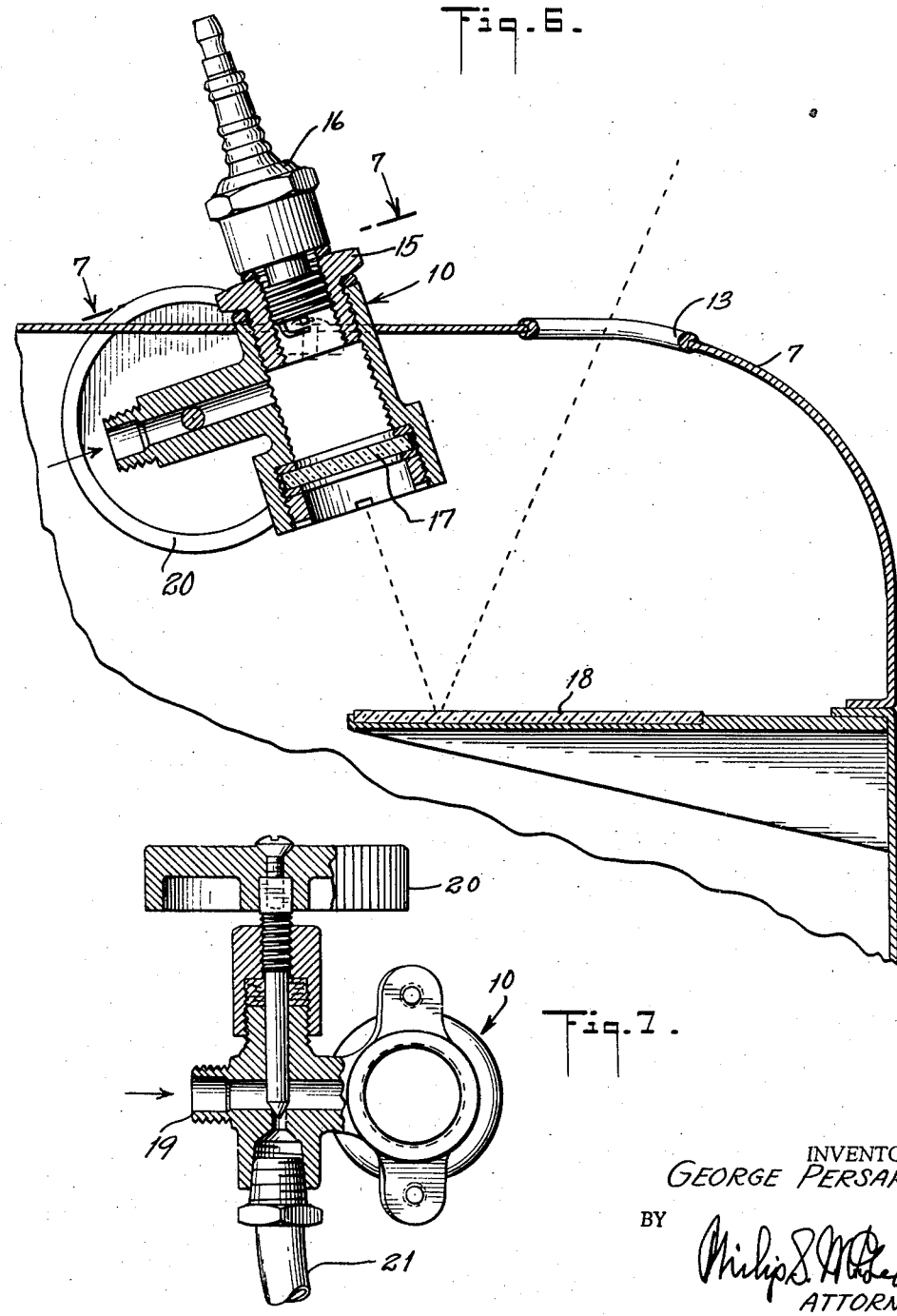

# United States Patent Office 2,892,149
Patented June 23, 1959

2,892,149

SPARK PLUG TESTER

George Persak, Jr., Verona, N.J., assignor to The Oiljak Manufacturing Co., Inc., Montclair, N.J., a corporation of New Jersey Application March 6, 1958, Serial No. 719,668

7 Claims. (Cl. 324—15)

The invention here disclosed relates to spark plug cleaning and testing.

Under present methods, it has been the general practice to test cleaned spark plugs by comparison with standard plugs, such as corresponding new plugs or similar cleaned plugs known to be of standard quality.

This system of comparison with a known standard is time consuming and uncertain and open to mistake in the choice of comparative plugs and otherwise lacking in efficiency.

Objects of the present invention are to overcome these faults and to provide quick definite reliable tests, which will show efficiency of cleaned spark plugs directly and without resort to comparative testing.

This is accomplished through recognition of the fact that pressure and size of spark gap have a definite relation and that for a given size gap, the spark should not quench below a certain pressure. The two values are inversely related. With increase in gap, the pressure at which the spark will quench is reduced. Conversely, with reduction of gap, the pressure required to quench the spark will be increased.

It is accordingly possible under this invention to lay out companion scales of spark gap and pressure and to correlate these with an indicator which can be set to a selected gap size and which will thereby be positioned to cooperate with a pressure gage pointer reading on the pressure scale to show on the thus positioned indicator whether the plug under test meets requisite standards.

In addition to the foregoing, special objects of the invention are to provide simple practical and efficient apparatus for accomplishing the results outlined.

Other desired objects and the novel features through which the purposes of the invention are accomplished are set forth and will appear in the course of the following specification.

The drawings accompanying and forming part of the specification illustrate a present commercial embodiment of the invention. Structure however, may be modified and changed as regards the immediate illustration, all within the true intent and scope of the invention as hereinafter defined and claimed.

Fig. 1 in the drawings is a perspective view of one of the new spark plug cleaning and testing units.

Fig. 2 is an outline view of the connected testing mechanism, involving the compression chamber in which the plug under test is mounted, the pressure control valve and the test indicator.

Fig. 3 is an enlarged sectional view of the test indicator as on substantially the plane of line 3—3 of Fig. 2.

Fig. 4 is a sectional view of the same on substantially the plane of line 4—4 of Fig. 3.

Fig. 5 is a detached face view of the indicator scale.

Fig. 6 is a broken sectional view of the compression chamber.

Fig. 7 is a broken sectional view of the latter on substantially the plane of line 7—7 of Fig. 6.

In the general view Fig. 1, the unit is shown as comprising a cabinet 7, containing at the cleaning end, a holder 8, for a spark plug to be cleaned and a control valve 9 for directing first an abrasive blast and then a cleaning blast against the plug under treatment and, at the testing end, a compression chamber 10, for holding a plug under test, a high tension connection 11, for that plug, a pressure graduating valve 12, a window opening 13, for observing the quenching action and an indicator 14, to be set to the size gap of the plug under test and which in conjunction with certain pressure gage mechanism, will then show the relative effectiveness of the tested plug.

The compression chamber 10, is shown in the form of a receptacle, having an exposed upper end for reception of adapters 15, for different size or designs of spark plugs 16, and closed at the lower end by a glass window 17, over a mirror 18, arranged to reflect the spark discharge up through the observation opening 13.

The pressure chamber 10, has a compressed air supply connection 19, at the back. The pressure reduction valve 12, is indicated as a needle valve controlling this connection and provided with an operating knob 20, exposed through the top of the cabinet.

An air pressure connection 21, is shown extending from the pressure controlled side of the air connections over to the pressure gage portion of the indicator 14.

The pressure gage mechanism may be of more or less conventional design, embodying an expansible element 22, driving through gearing 23, a pointer 24.

The face of the gage carries a pressure scale 25, in the range of travel of the pointer and below that a scale 26, graduated in terms of spark gap measurement.

Cooperatively related to both the pressure scale 25, and the plug gap scale 26, is an indicator carrying an index to register with the spark gap scale and spark plug values to register with the pressure scale and with the pointer reading on that scale.

This indicator is shown in the form of a ring 27, rotatably mounted on the body or casing 28, of the gage and connected at 29, to rotate a bezel 30, carrying a pointer 31, for indexing on the spark gap scale and indicating segments 32, 33, 34, to register with the gage pointer 24.

While three such indicating segments have been shown, one to indicate a condition of no value, a second to indicate some possible utility and a third to show full efficiency, it is contemplated that comparative values may change and that there may be more or less than such number of indications.

This novel combination and arrangement makes it possible to test a plug by simply screwing it by hand in the adapter, connecting the high tension conductor thereto and then after setting the indicator to the spark gap size of that particular plug, closing the sparking switch 35, and turning the knob 20, to bring the pressure up to the spark quenching stage.

Considering as a typical example, a spark plug having a gap of 30 thousandths of an inch should operate under a compression pressure up to about 136 lbs. per square inch. With the indicator set with index 31 on this figure of the plug gap scale, the high efficiency rating on the indicator will be in the range of approximately 116 to 136 lbs. on the pressure scale. Then with pressure brought up to within this range, as shown by the pointer on the pressure scale, the plug should spark unwavering with full intensity. If the pressure has to be reduced to hold the spark, it will be known that the plug is that much less effective. The pointer position on the efficiency scale at which the spark quenches therefore will always indicate the relative worth of the plug under test.

The indicator ring 27 is shown as rotatably confined to the casing by being sprung over catch lugs 36, struck out of the wall of the casing and received in an annular groove 37, formed in the inner wall of the ring.

Mounted in this way, the indicator ring serves to secure in place all the front parts of the instrument, including the glass cover plate 38, felt washer 39, bezel 30, inner felt washer 40 and supporting flange 41.

What is claimed is.

1. Spark plug tester comprising a pressure gage having a stationary pressure scale and a movable pressure positioned pointer reading on the same, said gage having also a stationary spark plug gap size scale and a movable indicator having an index reading on said spark plug gap scale, said indicator being adjustable to locate said index on the particular gap reading for a spark plug under test and said indicator further being provided with spark plug efficiency indications located to show by adjustment of said indicator in relation of the pointer thereto the relative efficiency of a spark plug of a selected gap size under test and variable pressure means for quenching the spark of a plug under test to thereby relate that plug to the efficiency indications for which said adjustable indicator has been set.

2. Spark plug tester comprising a pressure gage having a pressure scale and a pointer reading on the same, said gage having also a spark plug gap size scale, an indicator having an index reading on said spark plug gap scale and adjustable to locate said index on the particular gap reading for a spark plug under test and provided with spark plug efficiency indications located to show by relation of the pointer thereto the relative efficiency of a spark plug of a selected gap size under test, a compression chamber for holding a plug to be tested and means to vary pressure in said chamber to determine the operating pressure range of the plug under test.

3. Spark plug tester comprising a pressure gage having a pressure scale and a pointer reading on the same, said gage having also a spark plug gap size scale, an indicator having an index reading on said spark plug gap scale and adjustable to locate said index on the particular gap reading for a spark plug under test and provided with spark plug efficiency indications located to show by relation of the pointer thereto the relative efficiency of a spark plug of a selected gap size under test, and variable pressure means for quenching the spark of a plug under test, thereby to relate that plug to the efficiency ratings for which said indicator has been set.

4. Spark plug tester comprising a pressure gage having a pressure scale and a pointer reading on the same, said gage having also a spark plug gap size scale, an indicator having an index reading on said spark plug gap scale and adjustable to locate said index on the particular gap reading for a spark plug under test and provided with spark plug efficiency indications located to show by relation of the pointer thereto the relative efficiency of a spark plug of a selected gap size under test, variable pressure means for quenching the spark of a plug under test, thereby to relate that plug to the efficiency ratings for which said indicator has been set, including a compression chamber for holding a plug to be tested and a pressure control valve connected to control pressure in said chamber.

5. Spark plug tester comprising a pressure gage having a pressure scale and a spark plug gap scale on the face of the same and a pointer registering on said pressure scale, an indicator ring rotatably adjustable in respect to said spark plug gap scale and having an index registering on said spark plug gap scale, spark plug efficiency ratings on said indicator ring positioned to indicate efficiency of spark plugs of different gap sizes at different pressures and whereby the setting of said ring to the gap size of a plug under test will locate the efficiency ratings for that plug within the operating range of said pointer and variable pressure means for quenching the spark of a plug under test and connected with said pressure gauge for thereby relating a plug under test to the efficiency ratings to which said adjustable indicator has been set.

6. Spark plug tester comprising a pressure gage having a pressure scale and a spark plug gap scale on the face of the same and a pointer registering on said pressure scale, an indicator ring rotatably adjustable in respect to said spark plug gap scale and having an index registering on said spark plug gap scale and spark plug efficiency ratings on said indicator ring positioned to indicate efficiency of spark plugs of different gap sizes at different pressures, whereby the setting of said ring to the gap size of a plug under test will locate the efficiency ratings for that plug within the operating range of said pointer, a compression chamber for holding a plug to be tested, and pressure connections to said chamber and to said gage including a pressure control valve for controlling pressure admitted to said chamber and gage.

7. In a spark plug tester, a spark plug value indicator comprising a pressure gage having a pressure scale and a pointer reading on said scale, an open-ended casing enclosing said pressure gage, projections on said casing at the open end of the same, a rotatably adjustable ring engaged over the open end of said casing and provided with an internal annular groove receiving said projections on the casing and whereby said ring is rotatably confined to the casing, a transparent cover plate confined within said ring, a bezel in back of said cover plate and keyed to rotate with said ring and having spark plug value indications cooperable with the pointer of said pressure gage, a supporting flange engaged over the open end of said casing and packing washers of felt-like material engaged between said cover plate and bezel and between said bezel and supporting flange.

References Cited in the file of this patent
UNITED STATES PATENTS

| | | |
|---|---|---|
| 1,755,106 | Eckardt | Apr. 15, 1930 |
| 2,482,017 | McCoy | Sept. 13, 1949 |
| 2,552,344 | Persak | May 8, 1951 |